United States Patent
Hurlburt et al.

(10) Patent No.: US 11,732,158 B2
(45) Date of Patent: Aug. 22, 2023

(54) ADHESIVE COMPOSITIONS

(71) Applicant: Henkel AG & Co. KGaA, Duesseldorf (DE)

(72) Inventors: Lynnette Hurlburt, Manchester, CT (US); Andrew D. Messana, Newington, CT (US); Kevin J. Welch, Wallingford, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 982 days.

(21) Appl. No.: 16/601,005

(22) Filed: Oct. 14, 2019

(65) Prior Publication Data

US 2020/0040223 A1 Feb. 6, 2020

Related U.S. Application Data

(63) Continuation of application No. PCT/US2018/028749, filed on Apr. 21, 2018.

(60) Provisional application No. 62/488,365, filed on Apr. 21, 2017.

(51) Int. Cl.
| | | |
|---|---|---|
| C09J 4/06 | (2006.01) | |
| C08F 265/06 | (2006.01) | |
| C09J 5/00 | (2006.01) | |
| C09J 133/12 | (2006.01) | |
| C09J 151/00 | (2006.01) | |
| C09J 163/00 | (2006.01) | |

(52) U.S. Cl.
CPC .............. *C09J 4/06* (2013.01); *C08F 265/06* (2013.01); *C09J 5/00* (2013.01); *C09J 133/12* (2013.01); *C09J 151/003* (2013.01); *C09J 163/00* (2013.01)

(58) Field of Classification Search
CPC ..... C09J 4/06; C09J 5/00; C09J 133/12; C09J 151/003; C09J 163/00; C09J 133/04; C08F 265/06; C08F 287/00; C08F 290/048; C08K 5/3417; C08K 5/3437; C08G 73/06; C08L 33/06
See application file for complete search history.

(56) References Cited

U.S. PATENT DOCUMENTS

| | | | |
|---|---|---|---|
| 4,426,243 A | 1/1984 | Briggs | |
| 4,536,546 A | 8/1985 | Briggs | |
| 6,887,574 B2 | 5/2005 | Dean et al. | |
| 6,894,113 B2 | 5/2005 | Court et al. | |
| 7,670,649 B2 | 3/2010 | Hoyles et al. | |
| 7,745,535 B2 | 6/2010 | Schmidt et al. | |
| 7,820,760 B2 | 10/2010 | Pham et al. | |
| 8,481,659 B2 * | 7/2013 | Birkett | C07D 209/08 526/204 |
| 2008/0287595 A1 | 11/2008 | Verghese et al. | |
| 2010/0065210 A1 | 3/2010 | Schuft et al. | |
| 2014/0004366 A1 | 1/2014 | Jacobine et al. | |
| 2014/0235758 A1 * | 8/2014 | Cheng | C09J 109/00 523/438 |

FOREIGN PATENT DOCUMENTS

| | | |
|---|---|---|
| CN | 102686635 | 9/2012 |
| CN | 106715559 | 5/2017 |
| GB | 2166447 A | 5/1986 |
| JP | S6032868 | 2/1985 |
| JP | H0633019 | 2/1994 |
| JP | 2012525417 | 10/2012 |
| JP | 2016500741 | 1/2016 |
| WO | 2009018193 A1 | 2/2009 |
| WO | 2010008931 A1 | 1/2010 |
| WO | 2010127055 | 11/2010 |
| WO | 2010127055 A2 | 11/2010 |
| WO | 2013074265 A1 | 5/2013 |
| WO | 2014004315 A1 | 1/2014 |
| WO | 2014066315 | 5/2014 |
| WO | 2016054124 | 4/2016 |
| WO | 2016054124 A1 | 4/2016 |
| WO | 2016063128 | 4/2016 |

OTHER PUBLICATIONS

International Search Report issued in connection with International Patent Application No. PCT/US2018/028749 dated Jun. 13, 2018.

* cited by examiner

*Primary Examiner* — Daniel H Lee
(74) *Attorney, Agent, or Firm* — Steven C. Bauman

(57) ABSTRACT

The present invention provides fast fixturing two part adhesive compositions which include a first part containing a (meth)acrylic component and a cure system for an epoxy resin component of the second part and a second part containing an epoxy resin component and a cure accelerator for the (meth)acrylic component of the first part.

14 Claims, 4 Drawing Sheets

ADHESIVE COMPOSITIONS

BACKGROUND

Field

The present invention provides two part adhesive compositions which include a first part containing a (meth)acrylic component and a cure system for an epoxy resin component of the second part and a second part containing an epoxy resin component and a cure accelerator for the (meth)acrylic component of the first part. The cure accelerator is within structure A

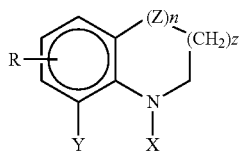

where X is H, $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH, Y is $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH, or X and Y taken together form a carbocyclic ring having from 5-7 ring atoms; Z is O, S, or NX', where X' is H, $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH; R is optional but when present may occur up to 3 times on the aromatic ring and when present is $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH; and n is 0 or 1; and z is 1-3, provided that when X is H, z is not 2 and is preferably 1.

Brief Description of Related Technology

Acrylic-based adhesive compositions are well known. See e.g. U.S. Pat. No. 4,536,546 (Briggs). While adhesives based on this technology appear to have been sold under the tradename PLEXUS MA 300 and 310 by Illinois Tool Works Inc., Chicago, Ill., they can exhibit an obnoxious odor and they are toxic to handle, which are significant drawbacks to their use.

Two-part epoxy resin compositions are also known, where one of the parts includes an acrylic-based adhesive. For instance, U.S. Pat. No. 4,426,243 (Briggs) describes an adhesive composition that is prepared from two different adhesive materials, one being an epoxy resin and the other an acrylate-based adhesive, being chemically bonded together by a bifunctional component having as one of its functional groups an epoxy and as the other an acrylate. See also U.K. Patent No. GB 2166447B.

U.S. Patent Application Publication No. 2010/0065210 provides a sag-resistant composition including: (a) a first part which includes: (i) a (meth)acrylic component, (ii) an amine catalyst; (iii) an optional second catalyst; (iv) a reactive acid component, and (v) a free-radical inhibitor; and (b) a second part which includes: (i) a resin component which includes epoxy groups, (ii) a peroxide; and (iii) a metal compound which complexes with the strong acid component and which is substantially non-reactive with the peroxide. The first and second parts are of sufficiently low viscosity to be easily dispensed with a pumping apparatus. To form this adhesive, the first and second parts are mixed, and immediately after mixing, the mixture is of a higher viscosity, such that the adhesive does not sag, drip, or migrate, after application to a surface within the open time of the mixture, and the mixed first and second parts cure. By the term "open time" is meant the elapsed time between the mixture of the adhesive to the curing.

U.S. Patent Application Publication No. 2014/0235758 provides an adhesive composition comprising:
(a) a first part comprising:
(i) a (meth)acrylic component at least a portion of which comprises isobornyl(meth)acrylate;
(ii) an amine catalyst;
(iii) a vinyl terminated polybutadiene in liquid form at room temperature;
(iv) a reactive acid component;
(v) a solid zinc (meth)acrylate salt;
(vi) a zinc and/or bismuth complex; and
(vii) a free-radical inhibitor; and
(b) a second part comprising:
(i) a resin component comprising epoxy groups;
(ii) a benzoyl peroxide;
(iii) a plasticizer; and
(vi) optionally, a block copolymer,
where when the first and second parts are mixed and applied to at least one substrate, the composition will have up to 5 minutes of open time and when the substrates are mated they will show a fixture time of less than 90 seconds at a temperature of less than 120° C. at which point the mated assembly can support 3 kg load.

In the context of anaerobic adhesive compositions, U.S. Pat. No. 8,481,659 provides cure accelerators within the following structure

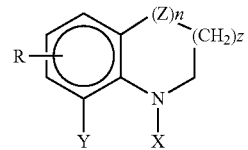

where X is $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH, Y is $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH or X and Y taken together form a carbocyclic ring having from 5-7 ring atoms; Z is O, S, or NX', where X' is H, $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH; R is optional but when present may occur up to 3 times on the aromatic ring and when present is $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH; and n is 0 or 1; and z is 1-3, provided that when X is H, z is not 2 and is preferably 1.

Nonetheless, it would be desirable to be able to provide in the context of two part adhesive compositions alternative constituents that may contribute to performance at least comparable, if not superior, to existing two part adhesive compositions and which carry favorable, or at least comparable or no more severe, regulatory labelling requirements as do such existing compositions.

SUMMARY

An adhesive composition is provided that comprises:
(a) a first part comprising:
(i) a (meth)acrylic component;
(ii) a cure accelerator within structure A

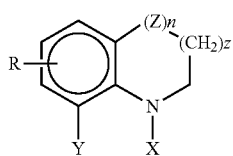

where X is $C_{1-20}$ alkyl, $C_{2-20}$ alkenyl, or $C_{7-20}$ alkaryl, functionalized by one or more groups selected from —OH, —$NH_2$ or —SH; Y is $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH or X and Y taken together form a carbocyclic ring having from 5-7 ring atoms; Z is O, S, or NX', where X' is H, $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH; R is optional but when present may occur up to 3 times on the aromatic ring and when present is $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —$NH_2$ or —SH; and n is 0 or 1; and z is 1-3;
(iii) a thermoplastic elastomer; and
(iv) a reactive acid component; and
(b) a second part comprising:
(i) an epoxy resin component;
(ii) a benzoyl peroxide;
(iii) a plasticizer; and
(iv) optionally, a block copolymer.
When the first and second parts are mixed and applied to at least one substrate, the composition will have up to 5 minutes of open time and when the substrates are mated they will show a fixture time of less than 90 seconds at a temperature of less than 60° C.

In another aspect, the present invention provides a method of bonding two surfaces, using the inventive two part adhesive composition.

DETAILED DESCRIPTION

Figure 1:
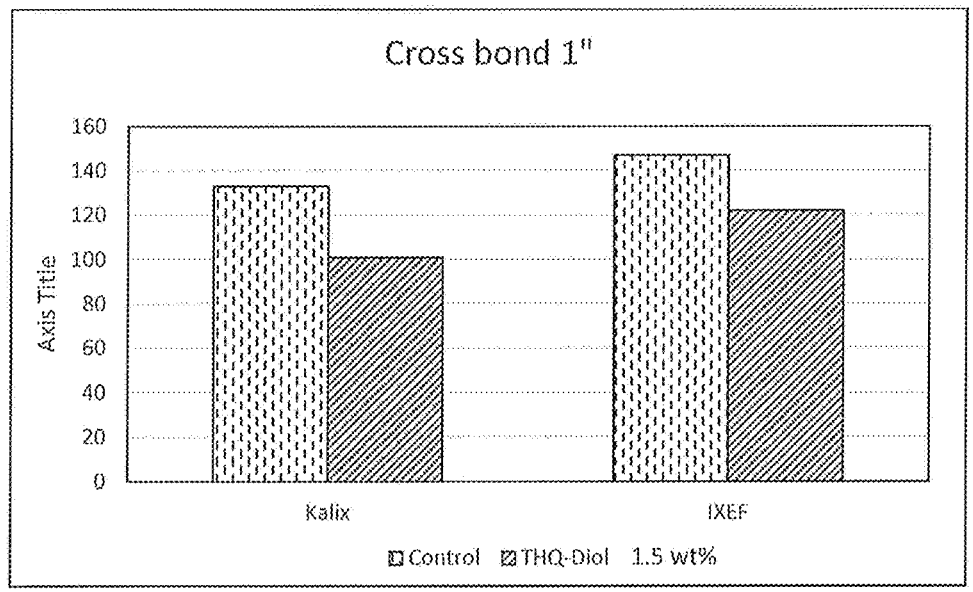
FIG. 1 depicts a bar chart measuring cross bond strength for Kalix substrates.

The inventive two part adhesive compositions are useful for a variety of applications, one of which is laminating metallic and/or polymeric materials for use in hand held display device assembly.

Accordingly, this invention provides a two part adhesive composition including a first part containing an acrylic component and a cure system for the epoxy resin component of the second part and a second part containing an epoxy resin component and a cure system for the acrylic component of the first part. The combination of Part A and Part B results in a composition that cures and forms a material suitable for use in the fabrication of laminates. Thus, the combination of Part A and Part B can be applied to a surface to be laminated, and that surface can be mated to a second surface to form the laminate. After curing, the composition forms an adhesive bond between the two surfaces.

Part A (Meth)acrylic Component

Any suitable material which contains at least one group having the following formula:

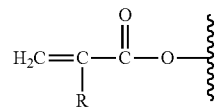

where R is selected from H, halogen, or $C_1$ to $C_{10}$ hydrocarbyl, may be used.

Advantageously, the group is a (meth)acryloxy group. The term "(meth)acryloxy" is intended to refer to both acrylate and methacrylate, in which R is H or methyl, respectively. The useful amount of the (meth)acrylic component typically ranges from about 20 percent by weight to about 80 percent by weight of the total composition. Desirably, the inventive compositions contain from about 50 percent by weight to about 70 percent by weight of (meth) acrylic component.

The (meth)acrylic component may be present in the form of a polymer, a monomer, or a combination thereof. When present in the form of a polymer, the (meth)acrylic component may be a polymer chain to which is attached at least one of the above-indicated groups. The groups may be located at a pendant or a terminal position of the backbone, or a combination thereof. Advantageously, at least two such groups may be present, and may be located at terminal positions. The (meth)acrylic component may have a polymer chain constructed from polyvinyl, polyether, polyester, polyurethane, polyamide, epoxy, vinyl ester, phenolic, amino resin, oil based resin, and the like, on which is (meth)acrylate functionality, as is well known to those skilled in the art. The polymer chain may be of a random, block or grafted construction.

The polymer chain may be formed by polymerization of vinyl monomers. Illustrative examples of such vinyl monomers are methyl (meth)acrylate, (meth)acrylic acid, ethyl (meth)acrylate, n-propyl (meth)acrylate, isopropyl (meth)

acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(meth)acryloyloxypropyltrimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, ethoxylated trimethylolpropane triacrylate, trimethylol propane trimethacrylate, dipentaerythritol monohydroxypentaacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate and ethoxylated bisphenol A di(meth)acrylate. These monomers may be used indirectly or as a plurality, they may be polymerized or copolymerized, as the case may be.

Particularly desirable vinyl monomers are (meth)acrylate ester monomers, including those where the alcohol portion of the ester group contains 1-8 carbon atoms. For instance, 2-ethylhexyl methacrylate, hydroxyethyl methacrylate, cyclohexyl methacrylate, ethyl methacrylate, 1,3-butanedioldimethacrylate ("BDMA"), butyl methacrylate and methyl methacrylate ("MMA"), are examples.

Cure Accelerator

The inventive compositions include a cure accelerator, which may be present in an amount from about 0.01 percent by weight to about 5 percent by weight, desirably from about 0.05 percent by weight to about 2 percent by weight, and more desirably, from about 0.3 percent by weight to about 0.7 percent by weight.

The cure accelerator may take many forms in the context of the present invention, such as adducts within structure A. These adducts may be prepared as follows:

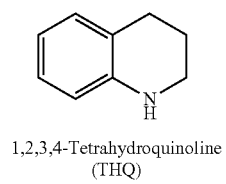
1,2,3,4-Tetrahydroquinoline (THQ)

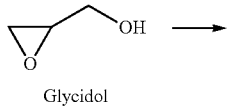
Glycidol

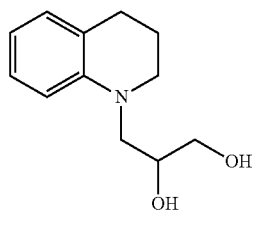
THQ-D  or

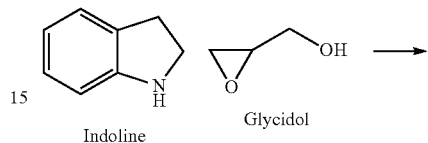
Indoline          Glycidol

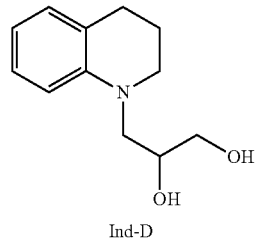
Ind-D

THQ-D (or THQ-Diol) and Ind-D (or Ind-Diol) are isomeric mixtures, represented as follows:

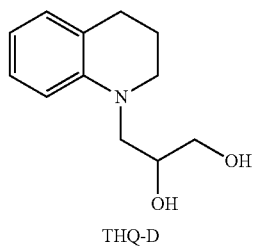 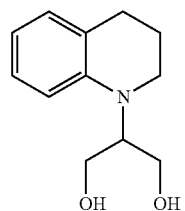
THQ-D

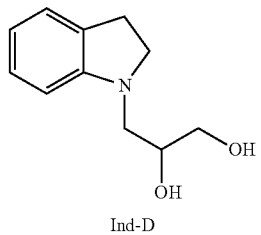 and 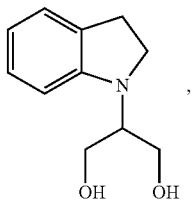
Ind-D respectively.

The cure accelerator embraced by structure A may be prepared from reactants comprising: (a) at least one compound selected from compounds represented by structure I:

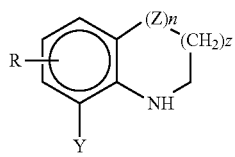

where R, Y, Z, n and z are as defined above, such as

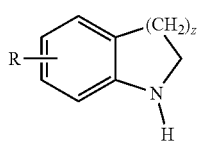

where R and z are as defined above, and (b) at least one compound selected from compounds represented by structure II:

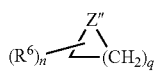

where Z" is selected from —O—, —S—, or —NH—; q is 1-2; $R^6$ is independently selected from hydroxyalkyl, aminoalkyl, or thioalkyl; and n is at least 1, where the reaction product comprises at least two pendant functional groups independently selected from —OH, —NH$_2$ or —SH.

Also, compounds within structure I or IA, as appropriate, may include

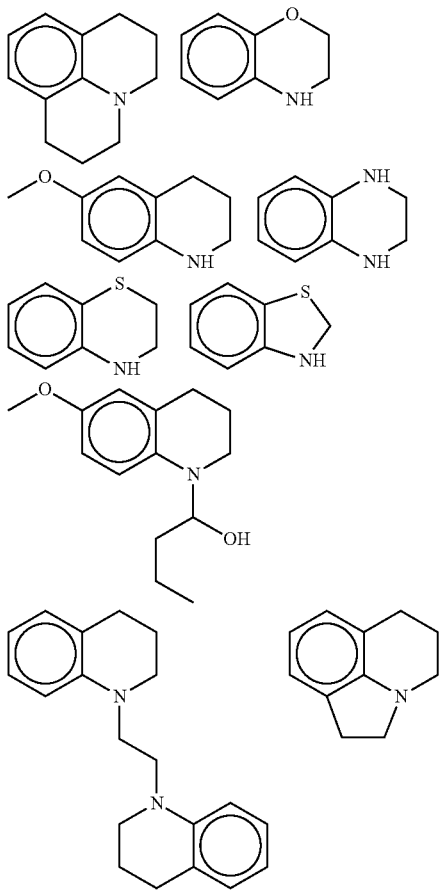

In the compounds of structure II above, Z" is desirably selected from —O—, —S—, or —NH—; q may be 1 to 4; $R^6$ may be independently selected from hydroxyalkyl, aminoalkyl, or thioalkyl; and n is at least 1. Desirably, the reactant represented by structure II is glycidol, as shown below:

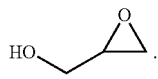

As discussed above, the reaction product comprises at least two pendant functional groups independently selected from —OH, —NH$_2$ or —SH. The reaction product comprises two or three pendant functional groups, such as hydroxy functional groups.

Desirably, the compound of structure I is based on THQ, indoline or indole. Thus, the compound of structure A when based on THQ, indoline or indole is a functionalized alkyl, functionalized alkenyl or functionalized alkaryl adduct of THQ, indoline or indole.

Thermoplastic Elastomers

The thermoplastic elastomers should be present in an amount of up to about 20 weight percent, such as about 5 weight percent to about 15 weight percent.

The vinyl-terminated polybutadienes should be in liquid form at room temperature. The vinyl-terminated polybutadienes should have a glass transition temperature below 0° C. The vinyl-termination may be in the form of (meth)acrylate-termination, for instance (meth)acrylate-terminated polybutadiene-acrylonitrile copolymers such as HYCAR VTBN, or (meth)acrylate-terminated polybutadiene, such as HYCAR VTB, each from BF Goodrich. The vinyl-terminated polybutadienes should be present in an amount of up to about 20 weight percent, such as about 5 weight percent to about 15 weight percent.

Reactive Acid/Ester Component

The inventive compositions include an acid or acid ester. Suitable acids or acid esters include (meth)acrylic acid or derivatives, phosphoric acid or derivatives, phosphate acid esters, and sulfonic acids or derivatives.

The reactive acid component is chosen from free-radical polymerizable acid monomers, such as ethylenically unsaturated mono or polycarboxylic acids, maleic acid and crotonic acid. Desirable ones include methacrylic acid ("MAA") and acrylic acid. The reactive acid component also modulates and decelerates the curing time of the thermoset composition. The cure accelerator in Part A cures the epoxy resin in Part B, but without a reactive ester component, the cure accelerator curing process is generally too rapid for very large parts or laminates, making fabrication of the laminate too difficult. Additionally, excessively fast curing can cause trouble during curing, such as excessive heat from the exothermic curing reaction, and give inconsistent or uneven curing, and the resultant product may have undesirable physical characteristics, such as bubbling, brittleness, or less tensile strength than can be achieved when the curing is at a more measured rate. Suitable phosphate esters include those represented by the formula:

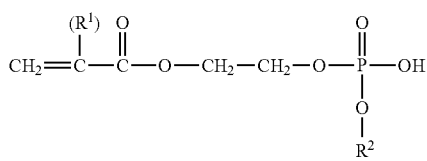

where $R^1$ is H or $CH_3$, and $R^2$ is H, or a radical represented by the structure:

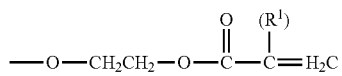

where $R^1$ is H or $CH_3$. A particularly useful phosphate ester is hydroxyl ethyl methacrylate ("HEMA") phosphate ester, which is sold under the tradenames T-MULZ 1228 or HARCRYL 1228 or 1228M, each available from Harcross Chemicals, Kansas City, Kans. Also included are structures with at least one strong acid "active hydrogen" group, or with at least one phosphonic acid active hydrogen group ($R_1R_2POOH$), such as hydroxyl ethyl diphosphonic acid, phosphonic acid, and derivatives, or oligomeric or polymeric structures with phosphonic acid functionality or similar acid strength functionality.

The reactive acid component is present from about 0.25 percent by weight to about 15 percent by weight of the composition. Desirably, where the reactive acid component is a phosphate ester, it is present from about 1.0 to 4.0 percent by weight of the composition.

Free Radical Inhibitors

Ordinarily, Part A also includes a free radical polymerization inhibitor, which prevents premature reaction prior to mixing with Part B.

Numerous suitable free-radical polymerization inhibitors are known, and include quinones, hydroquinones, hydroxylamines, nitroxyl compounds, phenols, amines, arylamines, quinolines, phenothiazines, and the like. Particularly useful free radical inhibitors include hydroquinone, tertiary butylhydroquinone ("TBHQ"), methyl hydroquinone, hydroxyethylhydroquinone, phenothiazine, and NAUGARD-R (blend of N-alkyl substituted p-phenylenediamines, from Addivant, Danbury, Conn.). One or more individual free radical inhibitor components may also be combined.

Other Additives

Part A may contain additional additives too, such as fillers, core shell polymers, lubricants, thickeners, and coloring agents. The fillers provide bulk without sacrificing strength of the adhesive and can be selected from high or low density fillers. Also, certain fillers, such as silica, can confer rheological modification or small particle reinforcements. Commercially available examples include Cab-O-Sil 610 and AEROSIL R8200.

Of particular interest are low density fillers, because the resulting final product has an otherwise lower density than a product without the filler, yet has essentially the same strength characteristics as if the filler was not present.

The core shell polymer is desirably a graft copolymer of the "core shell" type, or may also be a "shell-less" cross-linked rubbery particulate, such as acrylonitrile-butadiene-styrene ("ABS"), methacrylate-butadiene-styrene ("MBS"), and methacrylate-acrylonitrile-butadiene-styrene (MABS). BLENDEX 338 is an ABS powder from GE Plastics.

Part B

Epoxy Resins

Part B includes an epoxy resin component. The epoxy resin may include cycloaliphatic epoxy resins, epoxy novolac resins, bisphenol-A epoxy resins, bisphenol-F epoxy resins, bisphenol-A epichlorohydrin based epoxy resin, alkyl epoxides, limonene dioxides, and polyepoxides.

A desirable epoxy resin component is a cycloaliphatic one available commercially under the trade name CYRACURE UVR-6110 from Dow Chemical. UVR-6110 has the following structure:

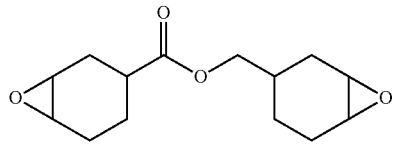 [SMILES: O=C(OCC1CCC2OC2C1)C1CCC2OC2C1]

Another suitable epoxy resin for use herein is a bisphenol based liquid epoxy resin, such as those available commercially under the trade name "D.E.R." from Dow Chemical. Examples of such D.E.R.-branded products include D.E.R. 332 (diglycidyl ether of bisphenol-A); D.E.R. 330 (low viscosity, undiluted, bisphenol-A liquid epoxy resin); D.E.R. 383 (low viscosity, undiluted, bisphenol-A liquid epoxy resin); D.E.R. 354 (standard, bisphenol-F based liquid epoxy resin); D.E.R. 351 (low viscosity, liquid bisphenol-A/F resin blend); D.E.R. 352 (low viscosity, liquid bisphenol-A/F resin blend); D.E.R. 324 (aliphatic glycidyl ether reactive diluent, modified liquid epoxy resin); D.E.R. 323 (aliphatic glycidyl ether reactive diluent, modified liquid epoxy resin); D.E.R. 325 (aliphatic glycidyl ether reactive diluent, modified liquid epoxy resin); and D.E.R. 353 (aliphatic glycidyl ether reactive diluent, modified liquid epoxy resin). A different brand of a bisphenol based liquid epoxy resin suitable for use herein is sold under the trade name EPON, such as EPON Resin 828, derived from bisphenol A and epichlorohydrin, and commercially available from Hexion Specialty Chemicals.

Another suitable epoxy resin component is an epoxy novolac resin. Epoxy novolac resins are products of epichlorohydrin and phenol-formaldehyde novolac. Many are available commercially under the trade name D.E.N. from Dow Chemical. Examples of D.E.N.-branded products that are suitable include D.E.N. 431 (low viscosity semi-solid epoxy novolac resin) and D.E.N. 438 (semi-solid epoxy novolac resin).

Other suitable epoxy resins include polyepoxides curable with catalysts or hardeners at ambient temperatures or at suitable elevated temperature. Examples of these polyepoxides include polyglycidyl and poly($\beta$-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcinol, quinitol, bis(4-hydroxycyclohexyl)methane, 2,2-bis(4-hydroxycyclohexyl)propane, and 1,1-bis(hydroxymethyl)-cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrabis(4-hydroxyphenyl)

ethane, 2,2,-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenols substituted in the ring by chlorine atoms or by alkyl groups each containing up to nine carbon atoms, such as 4-chlorophenol, 2-methylphenol, and 4-t-butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneureas, and hydantoins, such as 5,5-dimethylhydantoin.

Epoxy resins derived from oils, such as epoxidized soybean oil, epoxidized castor oil, and the like are also suitable for use herein.

Oxidants

As an oxidant, peroxides and peresters are useful. Benzoyl peroxide itself is a desirable choice for use as an oxidant in Part B. Commercially available benzoyl peroxide-containing compositions may also be used. Benox-50 210 Blue (from Syrgis Performance Initiators, Inc., Helena, Ark.), a peroxide paste believed to contain 49-50% benzoyl peroxide is one desirable choice. Benox-55 108 White, a peroxide paste believed to contain 54-56% benzoyl peroxide is another desirable choice. Still another desirable choice is Varox ASNS from R.T. Vanderbilt, Norwalk, Conn., a peroxide paste which is believed to contain 55% benzoyl peroxide.

Plasticizers

Plasticizers are used in Part B of the two part adhesive composition. Plasticizers may also be used in Part A as well. Plasticizers may be any liquid or soluble compound that assists with the flexibility of the reactive module of composition and/or may act as a carrier vehicle for other components of the composition. Examples include aromatic sulfonamides, aromatic phosphate esters, alkyl phosphate esters, dialkylether aromatic esters, polymeric plasticizers, dialkylether diesters, polyglycol diesters, tricarboxylic esters, polyester resins, aromatic diesters, aromatic triesters (trimellitates), aliphatic diesters, epoxidized esters, chlorinated hydrocarbons, aromatic oils, alkylether monoesters, naphthenic oils, alkyl monoesters, paraffinic oils, silicone oils, di-n-butyl phthalate, diisobutyl phthalate, di-n-hexyl phthalate, di-n-heptyl phthalate, di-2-ethylhexyl phthalate, 7c9c-phthalate (linear and branched), diisoctyl phthalate, linear 6c,8c,10c phthalate, diisononyl phthalate, linear 8c-10c phthalate, linear 7c-11c phthalate, diisodecyl phthalate, linear 9c-11c phthalate, diundecyl phthalate, diisodecyl glutarate, di-2-ethylhexyl adipate, di-2-ethylhexyl azelate, di-2-ethylhexyl sebacate, di-n-butyl sebacate, diisodecyl adipate, triethylene glycol caprate-caprylate, triethylene glycol 2-ethylhexanote, dibutoxyethyl adipate, dibutoxyethoxyethyl adipate, dibutoxyethoxyethyl formal, dibutoxyethoxyethyl sebacate, tri-2-ethylhexyl trimellitate, tri-(7c-9c (linear)) trimellitate, tri-(8c-10c(linear)) trimellitate, triethyl phosphate, triisopropyl phenyl phosphate, tributyl phosphate, 2-ethylhexyl diphenyl phosphate, trioctyl phosphate, isodecyl diphenyl phosphate triphenyl phosphate, triaryl phosphate synthetic, tributoxyethyl phosphate, tris(-chloroethyl) phosphate, butylphenyl diphenyl phosphate, chlorinated organic phosphate, cresyl diphenyl phosphate, tris (dichloropropyl) phosphate, isopropylphenyl diphenyl phosphate, trixylenyl phosphate, tricresyl phosphate, and diphenyl octyl phosphate.

Block Copolymers

When used, the block copolymer may be any block copolymer capable of contributing to the physical properties desired for the composition under consideration.

The block copolymer rubber may be constructed using blocks of either butadiene or isoprene with styrene (for example, SBS, SIS, SEBS and SB), commercial examples of which are available from Shell Chemical Co. as KRATON D-1116 and other KRATON D-grade elastomers from Dexco as VECTOR 2411IP.

Other elastomers with a glass transition temperature ("Tg") below about 25° C., which are soluble in methacrylate/acrylate monomers, can be used in place of the polychloroprene and/or the block copolymer rubbers. Examples of such are homopolymer of epichlorohydrin and its copolymers with ethylene oxide, available from Zeon Chemicals as HYDRIN, acrylate rubber pellets, available from Zeon as HYTEMP, polyisoprene rubber, polybutadiene rubber, nitrile rubber, and SBR rubber (random copolymer of butadiene and styrene).

Still other block copolymers may be a styrene maleic anhydride copolymer, represented by the formula:

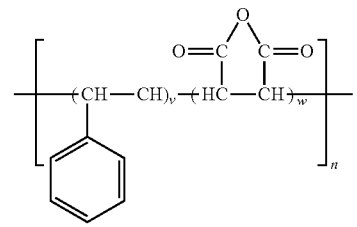

where v is from 1 to 12; w is from 1 to 6; and n is from 1 to 50.

Styrene maleic anhydride copolymers are well known and some of which are available commercially from Sartomer Company, Inc., Exton, Pa. under the trade name SMA EF80, for example. Styrene maleic anhydride copolymers represent the copolymerization product of styrene and maleic anhydride and are characterized by alternating blocks of styrene and maleic anhydride moieties.

Amphiphilic block copolymers may be particularly desirable. Arkema offers for sale commercially an amphiphilic block copolymer under the trademark NANOSTRENGTH. Such block copolymers are currently available in two versions: SBM and MAM. The SBM copolymer is reportedly made of polystyrene, 1,4-polybutadiene and syndiotactic poly(methyl methacrylate).

In addition, a polymer material constructed from polymethyl methacrylate ("PMMA") and polybutyl acrylate ("PB") may be used too. Polymer materials within this class are referred to as polymethylmethacrylate-block-polybutylacrylate-block polymethylmethacrylate copolymers ("MAM").

As reported by Arkema, MAM is a triblock copolymer, consisting of about 70% PMMA and 30% PB. MAM is constructed from distinct segments, which provides for the ability to self-assemble at the molecular scale. That is, M confers hardness to the polymer and A confers elastomeric properties to the polymer.

A hard polymer segment tends to be soluble in (meth) acrylates, whereas the elastomeric segments provide toughness to the polymeric (meth)acrylate, which forms upon cure. MAM also reinforces mechanical properties, without compromising inherent physical properties. MAM is commercially available under the tradename NANOSTRENGTH, at present under several different grades—i.e., E-21 and M-52N.

Arkema promotes the NANOSTRENGTH product line as an acrylic block copolymer that is miscible with many polymers, most of which according to the manufacturer are major industrial epoxy resins. See also U.S. Pat. No. 6,894,113, where in its abstract the '113 patent speaks to a thermoset material with improved impact resistance. The impact resistance is derived from 1 to 80% of an impact modifier comprising at least one copolymer comprising S-B-M, B-M and M-B-M blocks, where each block is connected to the other by a covalent bond or of an intermediary connected to one of the blocks by a covalent bond and to the other block by another covalent bond, M is a PMMA homopolymer or a copolymer comprising at least 50% by weight of methyl methacrylate, B is incompatible with the thermoset resin and with the M block and its glass transition temperature ("Tg") is less than the operating temperature of the thermoset material, and S is incompatible with the thermoset resin, the B block and the M block and its Tg or its melting temperature is greater than the Tg of B.

Another commercially available example of an amphiphilic block copolymer is a polyether block copolymer known to the trade as FORTEGRA 100, from Dow Chemical Co. Dow describes FORTEGRA 100 as a low viscosity toughening agent designed for use as a high efficiency second phase, in amine cured epoxy systems. FORTEGRA 100 is reported to provide improved toughness without significantly affecting the viscosity, glass transition temperature, corrosion resistance, cure rate or chemical resistance of the final coating or composition. FORTEGRA 100 is also reported to be useful for formulation into standard bisphenol A and bisphenol F epoxy systems as it does not participate in the epoxy cure reaction. As a second phase toughening agent, FORTEGRA 100 is promoted as being effective when formulated at a specific volume fraction of the finish film or part, typically 3% to 8% by dry volume is said to achieve the toughening effect.

Additional block copolymers include those which comprise both hydrophobic and hydrophilic segments or portions, of the general formula:

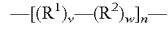

—[(R$^1$)$_v$—(R$^2$)$_w$]$_n$— where here R$^1$ is independently a hydrophobic olefin, such as ethylene, propylene, 1-butene, 1-hexene, 3-methyl-1-pentene, or 4-methyl-1-pentene or a polymerizable hydrophobic aromatic hydrocarbon such as styrene; each R$^2$ is a hydrophilic acid anhydride, such as maleic anhydride; v is from 1 to 12; w is from 1 to 6; and n is from 1 to 50.

The ratio of the hydrophobic segments to the hydrophilic segments in the styrene maleic anhydride block copolymer may be at least 2:1, such as between 3:1 and 12:1. The hydrophilic segments in the block copylymer should comprise an anhydride, such as maleic anhydride. The hydrophobic segments in the block copolymer should comprise at least one of ethylene, propylene, 1-butene, 1-hexene, 3-methyl-1-pentene, 4-methyl-1-pentene, or styrene. Desirably, the block copolymer should be prepared with the hydrophilic segments comprising maleic anhydride and the hydrophobic segments comprising styrene.

Reference to the following U.S. patent documents shows amphiphilic block copolymers suitable for use herein, and as such are incorporated herein by reference. U.S. Pat. No. 7,745,535 is directed to and claims an amphiphilic multiblock copolymer where at least one block is a profiled block consisting of a) a hydrophilic middle block made from one or more monomeric units selected from acrylic acid, methacrylic acid, and the salts, esters, anhydrides and amides of acrylic acid and methacrylic acid; dicarboxylic acid anhydrides; carboxyethyl acrylate; and acrylamides; and b) hydrophobic end blocks where the multiblock copolymer is water insoluble, water indispersible, and not soluble or dispersible in C$_{1-3}$ alcohols.

U.S. Pat. No. 7,820,760 is directed to and claims a curable adhesive epoxy resin composition including (a) an epoxy resin; (b) an amphiphilic block copolymer containing at least one epoxy resin miscible block segments and at least one epoxy resin immiscible block segments (where the immiscible block segment comprises at least one polyether structure provided that the polyether structure of the immiscible block segment contains at least one or more alkylene oxide monomer units having at least four carbon atoms); and (c) at least one curing agent. The amphiphilic block copolymer in the '760 patent is an all polyether block copolymer such as a PEO-PBO diblock copolymer or a PEO-PBO-PEO triblock copolymer. The amphiphilic block copolymer is present in an amount such that when in the '760 patent the epoxy resin composition is cured, the bond strength of the resulting cured epoxy adhesive resin composition increases compared to an epoxy resin composition without the amphiphilic polyether block copolymer.

U.S. Pat. No. 7,670,649 is directed to and claims a curable ambient cure high-solids coating composition including (a) an epoxy resin; (b) an amphiphilic block copolymer containing at least one epoxy resin miscible block segment (where the immiscible block segment comprises at least one polyether structure provided that the polyether structure of the immiscible block segment contains at least one or more alkylene oxide monomer units) and at least one epoxy resin immiscible block segment; and (c) a sufficient amount of a nitrogen-containing curing agent to cure the coating composition at ambient temperature of less than about 60° C. When the epoxy resin composition is cured, the toughness of the resulting cured epoxy resin composition is increased.

U.S. Pat. No. 6,887,574 is directed to and claims a curable flame retardant epoxy resin composition including (a) at least one flame retardant epoxy resin; (b) at least one amphiphilic block copolymer; and (c) a curing agent. Such components are present in the curable composition in the appropriate amounts and ratios such that, upon curing, the block copolymer self-assembles into a nano structure morphology, such as a worm-like micelle morphology. The resulting cured product is reported to have a remarkably increased high fracture resistance; and allows the use of flame retardant epoxies in applications where fracture resistance is an issue.

U.S. Patent Application Publication No. 2008/0287595 is directed to a composition comprising (1) a thermosettable resin selected from an epoxy resin, an epoxy vinyl ester resin, an unsaturated polyester resin or a mixture thereof, and (2) an amphiphilic block copolymer dispersed in the thermosettable resin. In addition, fiber-reinforced plastics ("FRP"), coatings and composites prepared from the composition are provided as well.

International Patent Publication No. WO 2010/008931 is directed to a structural composite that uses a block copolymer toughening agent to increase the fracture resistance (toughness) of the structural composite. The structural composite comprises (i) a carbon fiber reinforcing material and (ii) a thermosettable resin composition; wherein the thermosettable resin composition comprises (a) a thermosettable resin and (b) at least one block copolymer toughening agent.

International Patent Publication No. WO 2009/018193 is directed to curable compositions, cured compositions, and methods of forming the same, including an epoxy resin, a curing agent, an amphiphilic toughening agent, and an inorganic nanofiller, where the toughening agent forms a second phase having at least one dimension being on the nanometer scale.

The block copolymer may be used herein in an amount up to about 50 weight percent, desirably from 5 to 40 weight percent based on the total weight of the adhesive composition.

The Tg of the block copolymer should be above about 40° C., such as between about 40° C. and about 155° C.

The Tg of a polymer is the temperature at which the polymer becomes brittle on cooling or soft on heating. More specifically, Tg defines a pseudo second order phase transition in which a polymer yields, on cooling, a glassy structure with properties similar to those of a crystalline material. Above Tg, the polymer becomes soft and capable of plastic deformation without fracture. While the Tg is occasionally described as the "softening temperature" of a polymer, it is not uncommon for the polymer to begin softening at a temperature below the Tg. This is because, due to the nature of many non-crystalline polymers, the softening of the polymer may occur over a temperature range rather than abruptly at a single temperature value. Tg generally refers to the middle point of this range even though the polymer may begin to soften at a different temperature. For purposes of this application, the Tg of a polymer refers to the value as determined by ASTM E-1356.

In addition to becoming brittle at temperatures below Tg, a polymer also generally becomes drier and less tacky than when that same polymer is heated to a temperature above its Tg. A tacky polymer will more readily adhere to a surface upon application of pressure alone than a non-tacky polymer. The importance of incorporating a copolymer that has a Tg above 40° C., and thus is dry or only slightly tacky at this point, will become more apparent by the discussion that follows.

Other Additives

Part B may contain additional additives, such as fillers, lubricants, thickeners, and coloring agents. The fillers provide bulk without sacrificing strength of the adhesive and can be selected from high or low density fillers.

Of particular interest are low density fillers, because the resulting final product has an otherwise lower density than a product without the filler, yet has essentially the same strength characteristics as if the filler was not present.

Packaging and Mixing

Each of Part A and Part B are packaged in separate containers, such as bottles, cans, tubes, or drums.

Part A and Part B are mixed in a ratio of about 3 to 50 Part A to one Part B. Preferably, the ratio of Part A to Part B is about 5 to 20 Parts A to one Part B.

The mixing of the two parts can employ a mixing nozzle, which has fluid inputs for the two components, performs a suitable mixing operation, and dispenses the adhesive mixture directly onto the surface to be bonded. An example of a commercially available mixing and dispensing device is MIXPAC®, available from ConProTec, Salem, N.H. The two parts can also be mixed manually in a bowl, bucket, or the like, but the operator needs to ensure that the mixing is thorough. As an aid to ensuring that mixing is complete, each part can be formulated with a dye or pigment, so that after mixing, a third color is formed. For example, one part may have a yellow dye, the other part may have a blue dye, so that after mixing, the complete adhesive composition will be green.

The inventive compositions are excellent adhesives and sealants. On application to a first surface, such as a sheet of fabric that can be incorporated into a laminated material, a second surface will be mated with the first surface and the two surfaces will be bonded together as the adhesive cures. A further advantage is that no surface preparation is required to bond clean substrates.

By the term "curing" is meant that the chemical reaction converting the fluid mix to the solid bond of this invention. The curing process of acrylic-epoxy adhesives is well known in the art. See e.g. U.S. Pat. No. 4,426,243 (Briggs). The curing process is a chemical reaction between the acrylate and epoxy based polymers, to form an acrylic-epoxy adhesive.

After mixing, the compositions cure in about 15 to 1000 minutes at room temperature and for about 30 seconds to 120 seconds at a temperature of about 60° C. Of course, shorter cure times may be achieved with moderately higher temperature conditions. Desirably, the compositions cure in about 200 minutes at about 80° C., followed by 24 hour room temperature cure.

EXAMPLES

Synthesis

THQ-glycidol adducts (referred to in short as THQ-D or THQ-Diol) were prepared in accordance with the synthetic scheme depicted below:

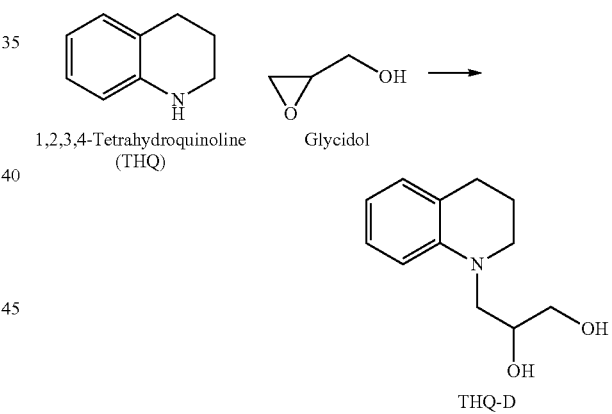

1,2,3,4-Tetrahydroquinoline (THQ)　　Glycidol

THQ-D

To a 500 ml four-neck round bottom flask, equipped with a condenser, addition funnel, nitrogen purge, magnetic stir bar and thermo-probe was added glycidol [8 grams; 108 mmoles] and THQ [14 grams; 108 mmoles]. The flask was placed on a hot plate maintained at 60° C. for 9 hours, during which time stirring continued. The reaction mixture was allowed to stand overnight at room temperature. 100 ml of deionized water was added, and the reaction mixture was again heated to 60° C.

The mixture was recrystallized with a combination of isopropyl alcohol/water, followed by deionized water, where a solid was observed to reform. The mixture was then filtered, the solid collected and vacuum dried in an oven at 50° C.

Formulations

Tables 1A and 1B show general formulating parameters and possible components used in each of Part A and Part B.

TABLE 1A

| Constituents | Part A (wt %) | | |
|---|---|---|---|
| | p-Tolyl diethanolamine (p-TDEA, Control) | THQ-diol (a, b, c) | n-Butyl THQ |
| Methylmethacrylate | 40-50 | 40-50 | 40-50 |
| Chelating Agent | 0.1 | 0.1 | 0.1 |
| Triphenylphosphine | 0.5 | 0.5 | 0.5 |
| Stabilizing Premix | 0.05 | 0.05 | 0.05 |
| Thermoplastic elastomer | 35-45 | 35-45 | 35-45 |
| Hydrocarbon Wax | 0.4 | 0.4 | 0.4 |
| Methacrylic acid | 10 | 10 | 10 |
| Surfactant | 1 | 1 | 1 |
| Cure Accelerator | 1.5 | 0.75, 1.5, 3.0 | 1.5 |
| Fumed Silica | 1 | 1 | 1 |

TABLE 1B

| Constituents | Part B (wt %) |
|---|---|
| Plasticizer | 25-35 |
| Oxidant | 37 |
| Epoxy | 15-25 |
| Colorant | 1 |
| Polyethylene wax | 11 |

A more specific example of a Part A formulation and a Part B formulation is set forth below.

Part A

A vessel was charged first with the KRATON-branded block polymer and the MMA (each in their amounts recorded), which were allowed to sit at room temperature for a period of about 24 hours. The vessel was then charged with the remaining constituents listed in the table below, in the amounts recorded, but for the AEROSIL-branded silica. The mixture was blended with an auger for 3 minutes at 3500 rpm. The AEROSIL-branded silica was then added and mixing continued for 2 minutes at that speed.

| Constituent | Amt/(g) |
|---|---|
| MMA | 45.95 |
| VERSENE 220[1] | 0.1 |
| Triphenylphosphine | 0.5 |
| Antioxidant premix | 0.05 |
| BLENDEX 338[2] | 4.5 |
| KRATON D 1155[3] | 22 |
| HYPRO 2000X168 VTB[4] | 13 |
| Microcrystalline paraffin wax 1239A | 0.4 |
| Methacrylic acid | 10 |
| HARCRYL 1228[5] | 1 |
| THQ-diol | 1.66 |
| AEROSIL 200 | 1 |

[1]EDTA
[2]Acrylonitrile butadiene styrene
[3]Linear block copolymer - 40% styrene and butadiene
[4]Methacrylate-terminated butadiene liquid rubber
[5]Phosphate esters of 2-hydroxyethylmethacrylate adhesion promotor The final Part A was packed into nylon cartridges for use in meter mix equipment.

Part B

A vessel was charged with 20.4 g BENZOFLEX 2088, 37 g dibenzoyl peroxide, 10 g PLURACOL V 10, 21 g bisphenol A epichlorohydrin and 11.5 g ECONOPOLY 2 N 1. The mixture was blended with an auger for 30 minutes at 1000 rpm. The final Part B was packed into nylon cartridges for use in meter mix equipment.

Mixing

Parts A and B were mixed with a MIXPAC nozzle set to a 10:1 mixture for the two parts. After mixing, the compositions demonstrated a work (or open) time of less than 5 minutes.

Performance

The mixed Part A/Part B formulations were evaluated for cross bond adhesion, tensile bond strength, T peel bond strength and/or wedge impact bond strength on substrates constructed from steel, stainless steel, aluminum, and Kalix.

Coupons were bonded 1" by 0.5", 30 mil bondline, and no surface preparation.

The cure profile for the mixed compositions once applied to the desired substrate was exposed to a temperature of 80° C. for a period of time of 20 minutes, followed by exposure to room temperature for a period of time of about 24 hours.

Adhesive cross bond strength for Kalix substrates is shown in FIG. 1 and captured below in Table A. In these evaluations, p-TDEA is used as a Control, and is referred to as such in the FIGs.

TABLE A

| Cure Accelerator | 0% (lbf/in) | 0.75% (lbf/in) | 1.50% (lbf/in) | 3.00% (lbf/in) |
|---|---|---|---|---|
| p-TDEA | 133 | 0 | 0 | 0 |
| THQ-Diol | 0 | 119 | 101 | 35 |

Figure 2:
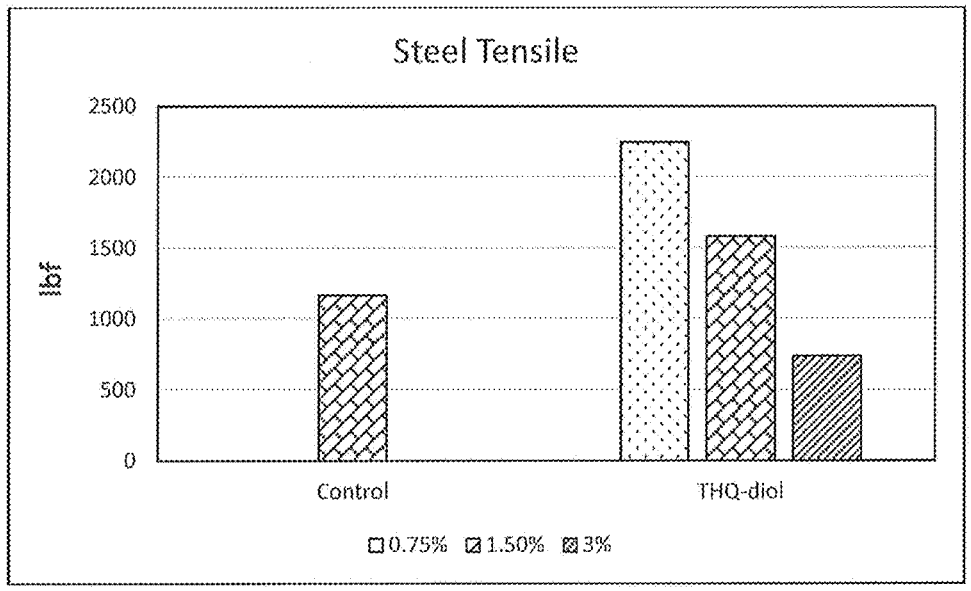
FIG. 2 depicts a bar chart measuring bond strength in tensile mode for steel substrates.

Adhesive bond strength in tensile mode for steel substrates is shown in FIG. 2 and captured below in Table B.

TABLE B

| Cure Accelerator | 0% (lbf/in) | 0.75% (lbf/in) | 1.50% (lbf/in) | 3.00% (lbf/in) |
|---|---|---|---|---|
| p-TDEA | 1167 | 0 | 0 | 0 |
| THQ-Diol | 0 | 2246 | 1584 | 738 |

Figure 3:
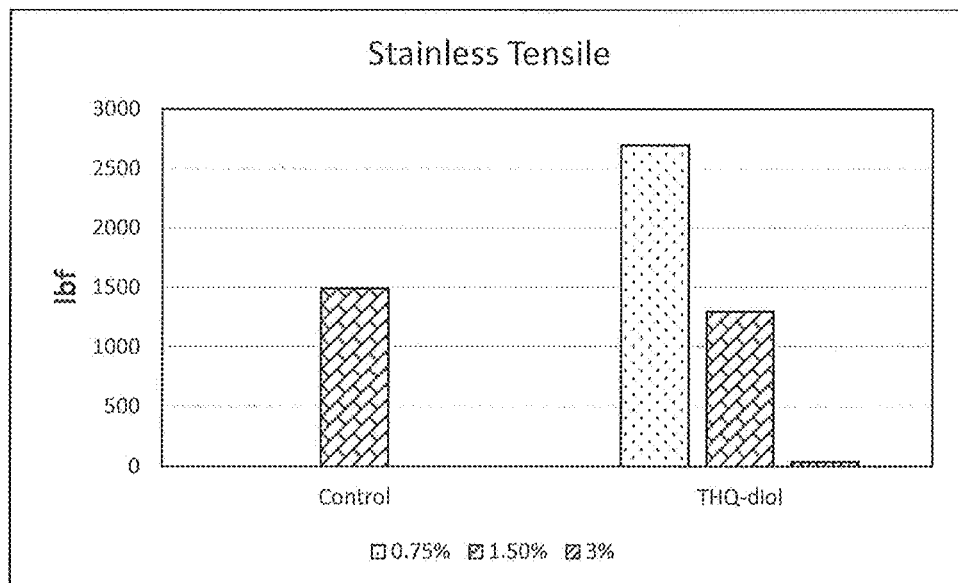
FIG. 3 depicts a bar chart measuring bond strength in tensile mode for stainless steel substrates.

Adhesive bond strength in tensile mode for stainless steel substrates is shown in FIG. 3 and captured below in Table C.

TABLE C

| Cure Accelerator | 0% (lbf/in) | 0.75% (lbf/in) | 1.50% (lbf/in) | 3.00% (lbf/in) |
|---|---|---|---|---|
| p-TDEA | 1491 | 0 | 0 | 0 |
| THQ-Diol | 0 | 2695 | 1299 | 38 |

Figure 4:
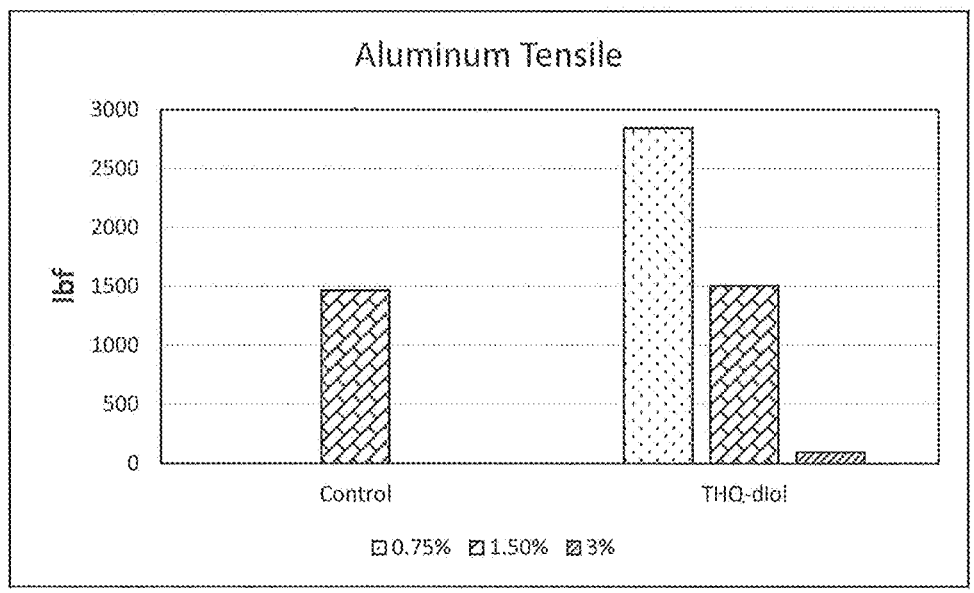
FIG. 4 depicts a bar chart measuring bond strength in tensile mode for aluminum substrates.

Adhesive bond strength in tensile mode for aluminum substrates is shown in FIG. 4 and captured below in Table D.

TABLE D

| Cure Accelerator | 0% (lbf/in) | 0.75% (lbf/in) | 1.50% (lbf/in) | 3.00% (lbf/in) |
|---|---|---|---|---|
| p-TDEA | 1464 | 0 | 0 | 0 |
| THQ-Diol | 0 | 2848 | 1504 | 92 |

Figure 5:
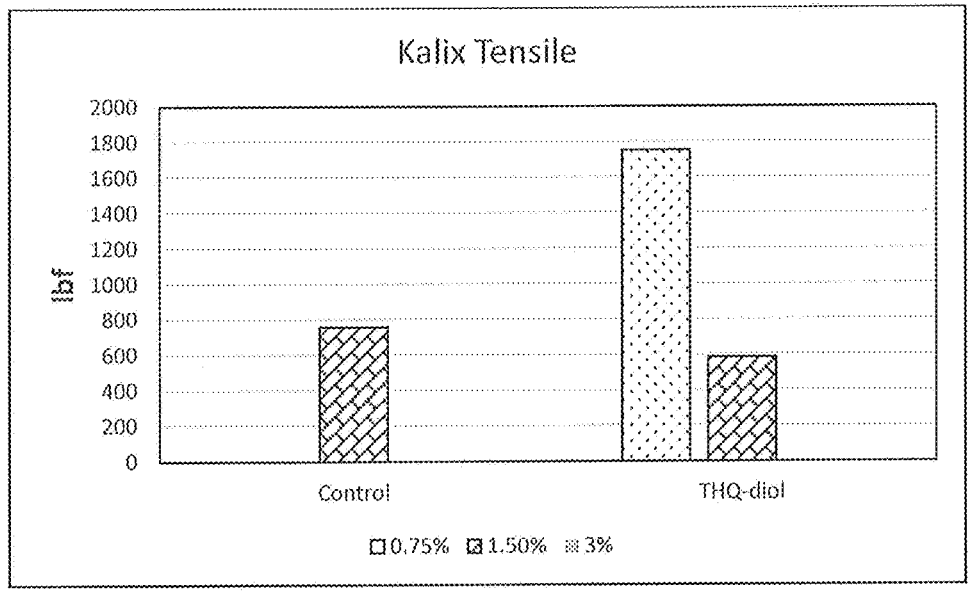
FIG. 5 depicts a bar chart measuring bond strength in tensile mode for Kalix substrates.

Adhesive bond strength in tensile mode for Kalix substrates is shown in FIG. 5 and captured below in Table E.

TABLE E

| Cure Accelerator | 0% (lbf/in) | 0.75% (lbf/in) | 1.50% (lbf/in) | 3.00% (lbf/in) |
|---|---|---|---|---|
| p-TDEA | 757 | 0 | 0 | 0 |
| THQ-Diol | 0 | 1753 | 585 | 0 |

Figure 6:
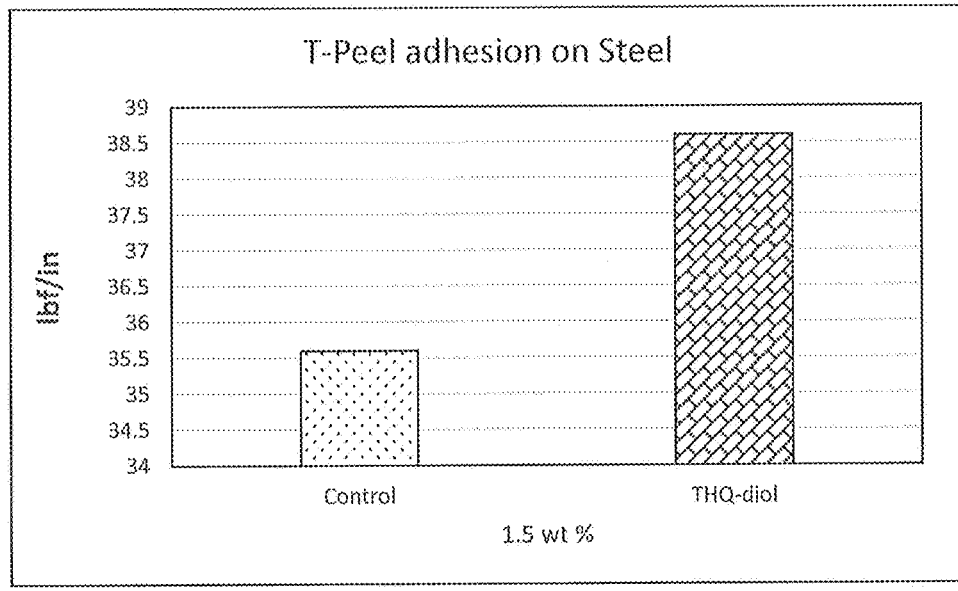
FIG. 6 depicts a bar chart measuring bond strength in tensile peel mode for steel substrates.

Adhesive bond strength in tensile peel mode for steel substrates is shown in FIG. 6 and captured below in Table F.

TABLE F

| Cure Accelerator | 0% (lbf/in) | 1.50% (lbf/in) |
|---|---|---|
| p-TDEA | 35.6 | 0 |
| THQ-Diol | 0 | 38.6 |

Figure 7:
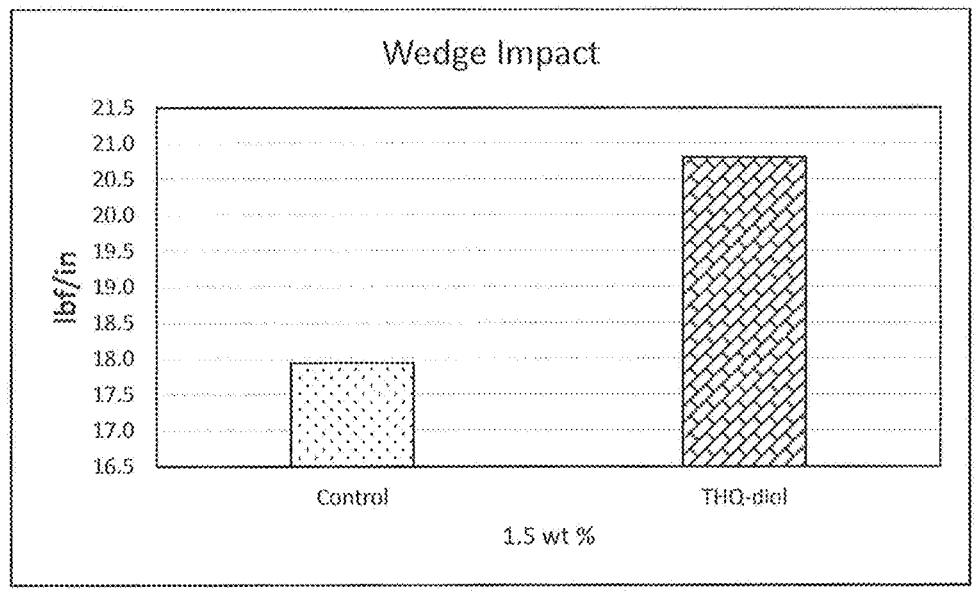
FIG. 7 depicts a bar chart measuring bond strength in wedge impact mode for steel substrates.

Adhesive bond strength in wedge impact mode for steel substrates is shown in FIG. 7 and captured below in Table G.

TABLE G

| Cure Accelerator | 0% (lbf/in) | 1.50% (lbf/in) |
|---|---|---|
| p-TDEA | 17.9 | 0 |
| THQ-Diol | 0 | 20.8 |

Here, a variety of accelerators were evaluated in a Part A formulation in an amount as in the example above. The Part B formulation was used as is described above in the example. Table H table below shows the color observed for each of the Part B formulation and of the Part A formulations with each of the different accelerators, and the color observed after mixing the Part A formulation with the Part B formulation. It is interesting to note that while the color of the mixed Parts A and Part B in each case changed, in all cases but one the change was a predictable one (e.g., the addition of a blue solution to a yellow one yields a green final product). In the THQ Diol-containing Part B, the color change of the mixed Part A and Part B yielded a blood red color.

TABLE H

| Accelerator | Part B Color | Part A Color | 2K Mixed Color |
|---|---|---|---|
| Control (toluidines) | Blue | Amber | Medium Green |
| Cyanobenzyl indoline | | Amber | Teal to Dark green |
| Cyanobenzyl THQ | | Amber | Teal |
| Nitrobenzyl indoline | | Gold/yellow | Medium Green |
| Nitrobenzyl THQ | | Gold/yellow | Medium Green |
| Ethyl acetate indoline | | Amber | Dark Green |
| THQ-diol | | Light Brown | Blood Red |
| Ferrocene | | Amber | Light Blue |

In Table I below, the accelerators used in the Part A formulations that were mixed with the Part B formulation are shown and their gel time and time to exotherm (each in minutes), and the maximum temperature reached during the exotherm are recorded. Here, it is seen that only the Part A formulation with THQ Diol demonstrated a gel time of over 5 minutes and a time to exotherm of 4 minutes or less, with the lowest maximum temperature reached of all of the accelerators evaluated that achieved a gel time and a time to exotherm, when mixed with the Part B formulation. The gel time could be viewed as an open time, which for the end user is desirably large because it allows the end user greater flexibility when fabricating assemblies that may be large in dimension or intricate in design. The shorter time periods for an exotherm to be reached is desirable so that once cure is initiated it occurs quickly. Whether this is viewed as a time to fixture or a time within which an appropriate level of bond strength has developed permits the end user to increase throughput of assembly fabrication. Finally, a lower maximum temperature reached during the exotherm translates to a safer environment in which the end user practices his/her trade and lessen the possibility of damaging the bonded substrates.

TABLE I

| Accelerator | Gel Time (min) | Time to Exotherm (min) | Max Temp (° C.) |
|---|---|---|---|
| Control (toluidines) | 3.5 | 6.8 | 111.27 |
| Cyanobenzyl indoline | 6 | 4.9 | 119.4 |
| Cyanobenzyl THQ | 7 | 5.8 | 112.03 |
| Nitrobenzyl indoline | 9 | 8.2 | 106.49 |
| Nitrobenzyl THQ | 7.5 | 9.2 | 103.01 |
| Ethyl acetate indoline | 1 | 2.4 | 132.48 |
| THQ-diol | 5.5 | 4 | 101.09 |
| Ferrocene | — | 4.4 | 45.94 |

What is claimed is:

1. An adhesive composition comprising:
    (a) Part A comprising:
       (i) a (meth)acrylic component;
       (ii) a cure accelerator represented by structure A

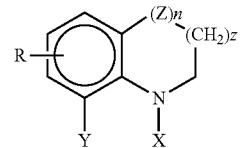

wherein X is H $C_{1-20}$ alkyl, $C_{2-20}$ alkenyl, or $C_{7-20}$ alkaryl, functionalized by one or more groups selected from —OH, —NH$_2$ or —SH, or X and Y taken together form a carbocyclic ring having from 5-7 ring atoms; Z is O, S, or NX', where X' is H, $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —NH$_2$ or —SH; R is optional but when present may occur up to 3 times on the aromatic ring and when present is $C_{1-20}$ alkyl, $C_{2-20}$ alkenyl, or $C_{7-20}$ alkaryl, any of the latter three of which may be interrupted by one or more hetero atoms or functionalized by one or more groups selected from —OH, —NH$_2$ or —SH; and n is 0 or 1; and z is 1-3;
       (iii) a thermoplastic elastomer; and
       (iv) a reactive acid/ester component; and
    (b) Part B comprising:
       (i) an epoxy resin component;
       (ii) an oxidant;
       (iii) a plasticizer; and
       (iv) optionally, a block copolymer.

2. The composition of claim 1, wherein the (meth)acrylic component of Part A is selected from the group consisting of methyl (meth)acrylate, (meth)acrylic acid, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)

acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(meth)acryloyloxypropyl trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate, and combinations thereof.

3. The composition of claim 1, wherein the cure accelerator is selected from

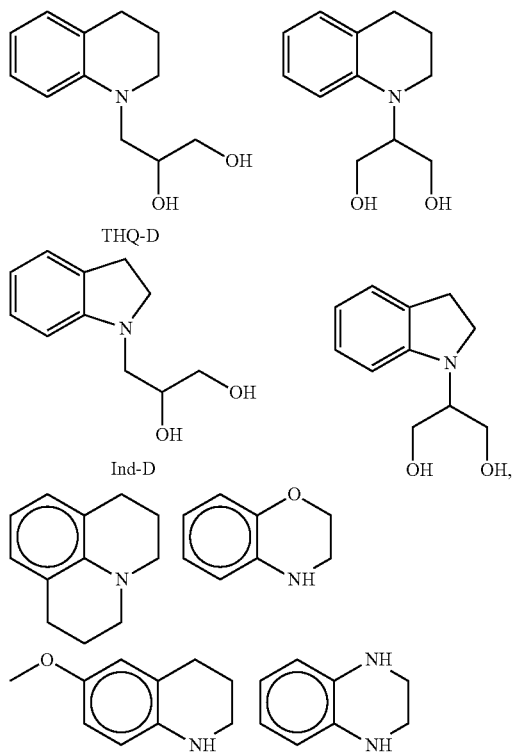

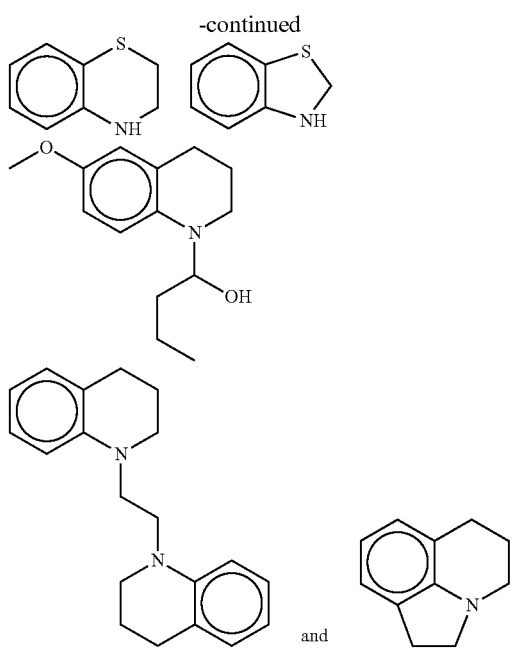

4. The composition of claim 1, wherein the reactive acid/ester component is selected from the group consisting of (meth)acrylic acid or (meth)acrylic acid derivatives, sulphonic acid, sulphonic acid derivatives, phosphoric acid, phosphoric acid derivatives, and phosphate esters.

5. The composition of claim 1, wherein the reactive acid/ester component is a phosphate ester comprising a compound of the formula:

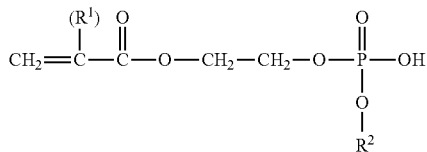

wherein $R^1$ is H or $CH_3$, and $R^2$ is H or:

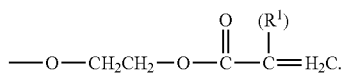

6. The composition of claim 1, wherein the reactive acid/ester component is hydroxyl ethyl methacrylate phosphate ester.

7. The composition of claim 1, further comprising a free radical inhibitor selected from the group consisting of quinones, hydroquinones, hydroxylamines, nitroxyls, phenols, amines, amines, quinolines, phenothiazines, and combinations thereof.

8. The composition of claim 1, further comprising a free radical inhibitor selected from the group consisting of hydroquinone, tertiary butylhydroquinone, phenothiazine, methyl hydroquinone, hydroxyethylhydroquinone, N-alkyl substituted p-phenylenediamines, and combinations thereof.

9. The composition of claim 1, wherein the epoxy resin component of Part B is selected from the group consisting of cycloaliphatic epoxy resins, epoxy novolac resins, bisphenol-A epoxy resins, bisphenol-F epoxy resins, bisphenol-A epichlorohydrin based epoxy resin, alkyl epoxides, limonene dioxide, polyfunctional epoxy resins, and combinations thereof.

10. The composition of claim 1, wherein the epoxy resin component of Part B is a bisphenol A epichlorohydrin epoxy resin.

11. The composition of claim 1, wherein the oxidant of Part B is benzoyl peroxide.

12. A method of bonding a first surface to a second surface, comprising:
    applying a two part composition according to claim 1 to at least one of a first surface and a second surface to be bonded;
    mating the first surface and the second surface, under conditions favorable to cure the two part composition and form an adhesive bond between the mated surfaces.

13. The composition of claim 1, wherein when Part A and Part B are mixed and applied to at least one substrate, the composition has up to 5 minutes of open time.

14. The composition of claim 1, wherein when the substrates are mated the composition demonstrates a fixture time of less than 90 seconds at a temperature of less than 60° C.

\* \* \* \* \*